Oct. 20, 1925.  
M. GROSSMANN  
1,557,931  
ELECTROLYTIC ELECTRICITY METER  
Filed July 20, 1923

Inventor:  
Max Grossmann

Patented Oct. 20, 1925.

1,557,931

UNITED STATES PATENT OFFICE.

MAX GROSSMANN, OF JENA, GERMANY, ASSIGNOR TO THE FIRM SCHOTT & GEN, OF JENA, GERMANY.

ELECTROLYTIC ELECTRICITY METER.

Application filed July 20, 1923. Serial No. 652,855.

*To all whom it may concern:*

Be it known that I, MAX GROSSMANN, a citizen of Germany, and residing at Jena, Germany, have invented a new and useful Electrolytic Electricity Meter (for which I have filed an application in Germany, August 7, 1922), of which the following is a specification.

In order to avoid that in electrolytic electricity meters with mercury anode the mercury is thrown into the cathode vessel by severe concussions to which the meter may be subjected, it has been suggested to separate the anode from the cathode vessel by a porous partition-wall. However, up till now only organic substances (e. g. silk or gold-beater's skin) or clay have been thought of for this purpose. All these substances, however, can only be fixed in an unreliable way on the glass body of the meter since it is impossible to fuse them on. Moreover, it is not advisable to fuse up a glass body having a partition-wall of an organic substance after the insertion of this partition-wall because thereby the latter would be endangered, however, without fusing up it is impossible to achieve a permanently reliable closure. Besides, organic substances are not sufficiently resistant to the concentrated mercury salt-solutions to be used in this case. According to the present invention the partition-wall is made of fritted glass i. e. a body consisting of glass particles which are but lightly fused together and which body is therefore porous. The porosity can in that case be determined in the desired way by the selection of the size of the glass particles from which one starts (i. e. the fineness of the glass powder or of the glass wool used); besides, it is possible to select within wide limits the thickness of the partition-wall and consequently its effect. Such a partition-wall can be fixed in a thoroughly reliable way on the body of the meter by means of fusing it on and nothing may prevent the closing of the body by having it fused up.

Figure 1:
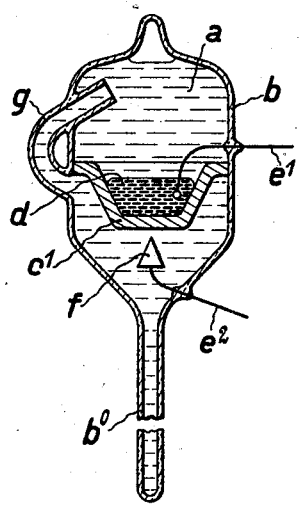
Figure 2:
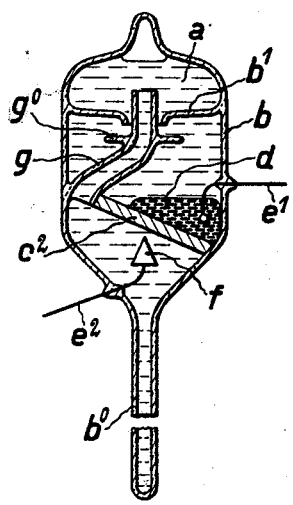
Figure 3:
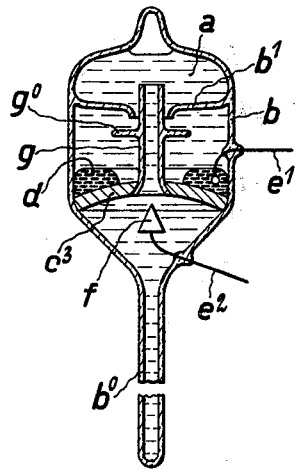

In the annexed drawing, Figs. 1, 2, and 3, respectively illustrate the invention by three constructional examples, showing a longitudinal section each through the upper part of the body of a meter.

In the example shown in Fig. 1 a small basin $c^1$ of fritted glass is fused by its margin into the glass body $b$ of the meter filled with the electrolyte $a$. The anode is formed by the mercury $d$ contained in this basin and into which projects a leading-in wire $e^1$. In the bottom part of the body $b$ the cathode $f$ is fixed on a leading-in wire $e^2$. The basin $c^1$ is not entirely filled with mercury and consequently the specifically heavier solution, formed above the mercury with the electrolysis, can pass in the upper part of the basin $c^1$ through the fritted glass and get to the cathode $f$, whilst on the other hand the solution, which owing to the liberation from the mercury has become specifically lighter, can also upwardly diffuse through the upper part of the basin $c^1$. Moreover, the part of the basin covered by the mercury also affords the possibility of conveying the mercury ions from the anode vessel into the cathode vessel since owing to the surface tension of the mercury there exists a possibility of the solution passing through between the mercury and the basin. A pipe $g$, leading from the cathode vessel into the anode vessel, admits, by tilting over the body, of reconducting the mercury led into the measuring tube $b^0$ into the anode vessel. However, the position of the orifice of this tube in the anode vessel and the comparatively small diameter of this orifice render it almost impossible that in the working position (shown in the drawing) of the meter mercury might be thrown by pushes from the anode vessel into the cathode vessel.

In the example shown in Fig. 2 there is used instead of a small basin a plane plate $c^2$ of fritted glass which is fused in an oblique position and not entirely covered by the mercury $d$. Hence also in this case a part of the porous partition-wall remains free from mercury, thus admitting of the passage of the electrolyte so far as this passage does not again take place below the mercury. In order to provide a still greater security against part of the mercury being thrown into the cathode vessel, the reconducting pipe $g$ is surrounded by a check-ring $g^0$ and the wall of the body $b$ provided with a check-surface $b^1$.

The example shown in Fig. 3 substantially differs from that shown in Fig. 2 only by the feature that the partition-wall is formed by an upwardly curved plate $c^3$ of fritted glass, whose middle part is not covered by the mercury.

I claim:

1. In an electrolytic electricity meter an anode vessel, a liquid anode, a cathode vessel below the anode vessel and communicating with it, the anode vessel and the cathode vessel adjoining each other in a wall consisting of fritted glass, a solid cathode, and an electrolyte contained in both vessels.

2. In an electrolytic electricity meter an anode vessel, a liquid anode, a cathode vessel below the anode vessel and communicating with it, the anode vessel and the cathode vessel consisting of glass and adjoining each other in a wall consisting of fritted glass, which wall is fused on the said two vessels, a solid cathode, and an electrolyte contained in both vessels.

MAX GROSSMANN.